United States Patent [19]  
Jacques

[11] Patent Number: 4,704,374  
[45] Date of Patent: Nov. 3, 1987

[54] NOVEL SPHEROIDAL SILICA PARTICULATES

[75] Inventor: Roland Jacques, Ales, France

[73] Assignee: Rhone-Poulenc Specialites Chimiques, Courbevoie, France

[21] Appl. No.: 885,676

[22] Filed: Jul. 15, 1986

[30] Foreign Application Priority Data

Jul. 15, 1985 [FR] France ................................ 85 10797

[51] Int. Cl.$^4$ ............................................. B01J 35/08
[52] U.S. Cl. ........................................ 502/8; 502/232; 502/439; 423/335
[58] Field of Search .................... 502/8, 232, 233, 407, 502/439; 423/335, 338

[56] References Cited

U.S. PATENT DOCUMENTS

| 2,698,305 | 12/1954 | Plank et al. | 502/232 |
|---|---|---|---|
| 3,567,645 | 3/1971 | Dultz | 502/8 |
| 3,607,044 | 9/1971 | List et al. | 502/232 |
| 3,647,709 | 3/1972 | Hill | 502/407 |
| 3,819,811 | 6/1974 | Aboutboul et al. | 423/338 |
| 3,935,299 | 1/1976 | Kiselev et al. | 502/407 |
| 3,975,293 | 8/1976 | LePage | 502/233 |
| 4,070,286 | 1/1978 | Iler et al. | 502/8 |
| 4,076,651 | 2/1978 | Jacques | 423/338 |
| 4,255,286 | 3/1981 | Berek et al. | 423/338 |
| 4,256,682 | 3/1981 | Denton | 502/232 |
| 4,384,086 | 5/1983 | McDaniel et al. | 502/233 |
| 4,508,607 | 4/1985 | Winyall | 423/335 |
| 4,508,841 | 4/1985 | Onuma et al. | 423/335 |
| 4,548,912 | 10/1985 | Hettinger et al. | 502/8 |
| 4,599,321 | 7/1986 | Rainis | 502/8 |
| 4,649,037 | 3/1987 | Marsh et al. | 423/338 |

*Primary Examiner*—Andrew Metz  
*Assistant Examiner*—Anthony McFarlane  
*Attorney, Agent, or Firm*—Burns, Doane, Swecker & Mathis

[57] ABSTRACT

Mechanically strong, $H_2O$-stable, macroporous spheroidal silica particulates, well adopted as catalysts/catalyst supports, are produced by (i) granulating and agglomerating a particular hydrosol of silica with a particular silica xerogel or aerogel, and (ii) drying the resultant silica particulates.

13 Claims, No Drawings

NOVEL SPHEROIDAL SILICA PARTICULATES

BACKGROUND OF THE INVENTION

1. Field of the Invention:

The present invention relates to novel spheroidal silica particulates and to a process for the preparation thereof. This invention more especially relates to novel spheroidal silica particulates having improved macroporosity and to the use thereof as either catalysts or catalyst supports.

2. Description of the Prior Art:

Catalysts or catalyst supports based on silica must generally have a porosity which facilitates a rapid diffusion of surface gases towards the active inner centers thereof, and vice versa. This is the reason why macroporosity is a usual requirement. Furthermore, these catalysts or supports must have a mechanical strength that is, in particular, retained after impregnation thereof with a catalytic active phase, as well as during their use under the conditions of the process in which they are utilized.

Various processes for the production of spheroidal silica particles are known to this art. Thus, German Patent No. 1,266,741 describes the formation, by the sol-gel method, of a silica hydrogel mixed with a solution of an alkaline silicate in the presence of an acid. Drops of the mixture are formed which are allowed to fall and coalesce into a nonmiscible liquid, the spheres obtained being dried, and then calcinated. The principal disadvantage of this process is that it is complicated and delicate to carry out, and yields materials, the cost of production of which is high. Furthermore, the product spheroidal particulates explode on being soaked in water or on being impregnated with solutions containing active catalytic phases.

Furthermore, also proposed to this art have been less difficult processes for the production of spheroidal silica particulates by granulation. Thus, German Patent No. 1,187,588 describes a process in which an aqueous silica sol containing magnesium oxide as binder is mixed with silicated and siliceous charges. The disadvantage of such a process is that it requires the use of a binder, and the resultant porosities are not satisfactory.

Thus, it heretofore has not been possible to economically produce spheroidal silica having adequate macroporosity and satisfactory mechanical strength, particularly upon impregnation with active catalytic phases. Furthermore, the prior art processes have required the use of a binder uncombined with silicon.

SUMMARY OF THE INVENTION

Accordingly, a major object of the present invention is the provision of an improved, inexpensive process for the production of spheroidal silica particulates by granulation, said silica particulates not only having adequate macroporosity, but also they do not become fragile when soaked in water or in a solution of an active catalytic phase. Moreover, surprisingly, the process of the invention does not require the use of a binder, or of a gelling agent uncombined with silicon.

Briefly, the present invention features the production of spheroidal silica particulates by granulation of a mixture of silica hydrosol and a silica xerogel or aerogel, wherein the granulation is used to agglomerate a silica hydrosol, the particles of said silica xerogel or aerogel having an average diameter ranging from 5 to 25 microns, and the amount of silica in the hydrosol, expressed in $SiO_2$, and the amount of silica in the xerogel or aerogel, also expressed in $SiO_2$, ranging from 15 to 35%, and thereafter drying the product spheroidal silica particulates.

DETAILED DESCRIPTION OF THE PREFERRED EMBODIMENTS OF THE INVENTION

More particularly according to the present invention, in the subject process the hydrosol and the xerogel or aerogel are agglomerated by means of any suitable granulation apparatus. Such apparatus may be a rotating granulator, or any other similar device permitting the production of spheres by granulation of a powder and a binder.

The silica hydrosol has a silica content ranging from 15 to 35% by weight, preferably from 18 to 30%, and the specific surface of the hydrosol, measured after drying at 200° C. by the B.E.T. method, preferably ranges from 150 to 500 $m^2/g$ and more preferably from 300 to 450 $m^2/g$. The silica hydrosol can itself be prepared in different ways. It may in particular be prepared by hydrolysis of silicic esters, by partial neutralization or total neutralization of a silicate solution with acids, or by ion exchange treatment of a silicate solution and concentration.

The dimensions of the silica particles constituting the hydrosol are preferably less than approximately 100Å.

The xerogel used in the process according to the invention is in conformity with the definition given in the text by Ralph K. ILER, *The Chemistry of Silica*, a Wiley Interscience publication, 1978, pages 463, 533. This xerogel is prepared as indicated in the ILER text, and preferably by reaction between sodium silicate and sulfuric acid.

The aerogel used in the process according to the invention is in conformity with the definition given in ILER, op. cit., pages 537 et sea.

Consistent herewith, the silica xerogel or aerogel comprises particles having an average diameter of from 5 to 25 microns and preferably from 10 to 20 microns.

This mean diameter value is a critical factor in the process according to the invention. Indeed, on the one hand, below 5 microns it has been shown that the spheroidal particles obtained do not have adequate macroporosity and are thus of little use for catalysis, and, on the other hand, above 25 microns, the spheroidal particles do not have adequate solidity. A good compromise between macroporosity and solidity is obtained by using xerogel particles, the mean diameter of which preferably ranges from 15 to 20 microns.

In the process according to the invention, the relationship between the amount of silica in the hydrosol, expressed in $SiO_2$, and the amount of silica in the xerogel or aerogel, expressed in $SiO_2$, ranges from 15 to 35%.

Agglomeration of the xerogel or of the aerogel and hydrosol is by means of a granulation apparatus such as a turning bowl, rotating granulator, or the like. The dwell time of the mixture in the granulator preferably ranges from 1 to 15 minutes.

After agglomeration, the resulting spheroidal silica particulates are dried. The drying is preferably carried out at a temperature of from 200° to 800° C. and more particularly from 400° to 500° C.

The spheroidal silica particles obtained by the process according to the invention have a macroporosity especially suitable for their use either as catalyst or catalyst support. This macroporosity furthermore permits a deposition thereon of a high content of active catalytic phase, thus ensuring notable catalytic activity. The macroporosity volume is typically greater than 0.5 cm$^3$/g and preferably is greater than 0.7 cm$^3$/g. By "macroporosity" according to the invention, pores are intended, the diameter of which is greater than 1,000Å.

The distribution and the dimensions of the pores is particularly characteristic of the particles obtained according to the process of the invention. They are such that the distribution of porous volumes according to the size of the pores is as follows:

| $\phi$ in Å | <100 | 100–1,000 | 1,000–10,000 | >10,000 |
|---|---|---|---|---|
| $v$ cm$^3$/g | 0–0.60 | 0.05–0.50 | 0.05–0.20 | 0.05–0.20 | where $\phi$ represents the diameter of the pores and $v$ the volume of the pores having a diameter within the above limits.

The process according to the invention enables the provision of spheroidal particulates having an external diameter of from 1 to 10 mm and in particular larger than 5 mm, spheroidal particulates which heretofore have been exceedingly difficult to produce by known processes without their becoming fragile in water.

The spheroidal silica particulates of the invention can be used either as catalysts or catalyst supports.

In order to further illustrate the present invention and the advantages thereof, the following specific examples are given, it being understood that same are intended only as illustrative and in nowise limitative.

EXAMPLE 1

100 kg silica, having the following characteristics: BET surface 450 m$^2$g, VPT 72 cm$^3$/100 g, mean $\phi$ of particles 12 μm, were agglomerated in a rotating PVC basin in the form of 5–6 mm spheres by spraying a dispersion of colloidal silica particles having 20% SiO$_2$ and BET surface of 400 m$^2$/g.

To agglomerate 100 kg silica, 106 kg of 20% silica sol were used, i.e., a ratio of amount of silica in the hydrosol to that in the xerogel of 21.2%.

Characteristics of the product spheroidal particulates are reported in Table 1 below.

EXAMPLE 2

100 kg synthetic silica gel were crushed in a ball-crusher, in order to produce particles having a mean diameter of 12–15 μm and a granulometric distribution such that:

| <2μ | <4μ | <6μ | <8μ | <12μ | <16μ | <25μ | <32μ |
|---|---|---|---|---|---|---|---|
| 2% | 5% | 16% | 27% | 48% | 60% | 80% | 85% |

In a rotating PVC bowl, the powdered silica was granulated into spheroidal particles of 4–6 mm, by spraying with a dispersion of colloidal silica particles having 30% SiO$_2$ and a BET surface of 500 m$^2$g.

To granulate 20 kg silica, 21 kg hydrosol were used, this corresponding to a silica hydrosol/silica xerogel ratio of 31.5%.

The characteristics of the product spheroidal particulates are reported in Table 1 below.

EXAMPLE 3—COMPARATIVE TABLE

Table 1 below shows two comparative columns 1 and 2 relating to spheroidal particles produced by the oil-drop technique and marketed respectively by Kali-Chemie and Shell under the respective trademarks "KC Silica perle AF 125" and "Silica spheres 5970Al":

TABLE 1

| Spheroidal particles | Example 1 | Example 2 | Comparative 1 | Comparative 2 |
|---|---|---|---|---|
| Surface BET m$^2$/g | 260 | 85 | 300 | 270 |
| VPT cm$^3$/g | 0.75 | 0.70 | 1.00 | 1.00 |
| $v$ cm$^3$/g for $\phi$ in Å < 100 | 0.25 | 0.05 | 0.70 | 0.25 |
| 100–1,000 | 0.25 | 0.47 | 0.20 | 0.80 |
| 1,000–10,000 | 0.12 | 0.08 | 0.10 | 0.01 |
| >10,000 | 0.13 | 0.10 | 0.01 | 0.00 |
| Resistance to water | yes | yes | no | no |
| External $\phi$ in mm | 2 to 7 | 2 to 7 | 2 to 5 | 1.5/3 |

The above table clearly shows that only the particulates according to the invention have the desired macroporosity and that, furthermore, only these particulates have a resistance to water sufficient to enable them to be undamaged by soaking in water, or by impregnation with solutions containing active catalytic elements.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Macroporous, granular, spheroidal silica particulates which are mechanically strong and stable in aqueous media, said particulates having the following distribution of pore volumes to pore size:

| $\phi$ in Å | <100 | 100–1,000 | 1,000–10,000 | >10,000 |
|---|---|---|---|---|
| $v$ cm$^3$/g | 0–0.60 | 0.05–0.50 | 0.05–0.20 | 0.05–0.20 | wherein $\phi$ is pore diameter and $v$ the corresponding pore volume.

2. The spheroidal silica particulates as defined by claim 1, wherein the diameters range from 1 to 10 mm.

3. The spheroidal silica particulates as defined by claim 1, wherein said particulates have diameters of at least 5 mm.

4. The spheroidal silica particulates as defined by claim 1, wherein said particulates have a macroporosity volume greater than 0.5 cm$^3$/g.

5. The spheroidal silica particulates as defined by claim 4, wherein said particulates have a macroporosity volume greater than 0.7 cm$^3$/g.

6. A catalyst comprising the spheroidal silica particulates as defined by claim 1.

7. A catalyst support comprising the spheroidal silica particulates as defined by claim 1.

8. A process for the preparation of macroporous, granular, spheroidal silica particulates which are mechanically strong and stable in aqueous media, said particulates having the following distribution of pore volumes to pore size:

| $\phi$ in Å | <100 | 100–1,000 | 1,000–10,000 | >10,000 |
|---|---|---|---|---|
| $v$ cm$^3$/g | 0–0.60 | 0.05–0.50 | 0.05–0.20 | 0.05–0.20 | wherein $\phi$ is pore diameter and $\nu$ the corresponding pore volume, said process comprising the steps of (i) granulating and agglomerating a mixture of silica hydrosol and a silica xerogel or aerogel, said xerogel or aerogel comprising particles having a mean diameter of from 5 to 25 microns, and the amount of silica in the hydrosol, expressed as $SiO_2$, and the amount of silica in said xerogel or aerogel, also expressed as $SiO_2$, each ranging from 15 to 35% by weight, and (ii) drying the resultant silica particulates.

9. The process as defined by claim 8, wherein the silica content of said hydrosol ranges from 18 to 30%.

10. The process as defined by claim 8, wherein the BET of the hydrosol, measured after drying at 200 °C., ranges from 150 to 500 m²/g.

11. The process as defined by claim 10, wherein said BET ranges from 300 to 450 m²/g.

12. The process as defined by claim 8, wherein said mean diameter ranges from 10 to 20 microns.

13. The process as defined by claim 8, wherein said drying is carried out at a temperature of from 200° to 800° C.

* * * * *